Figure 1:
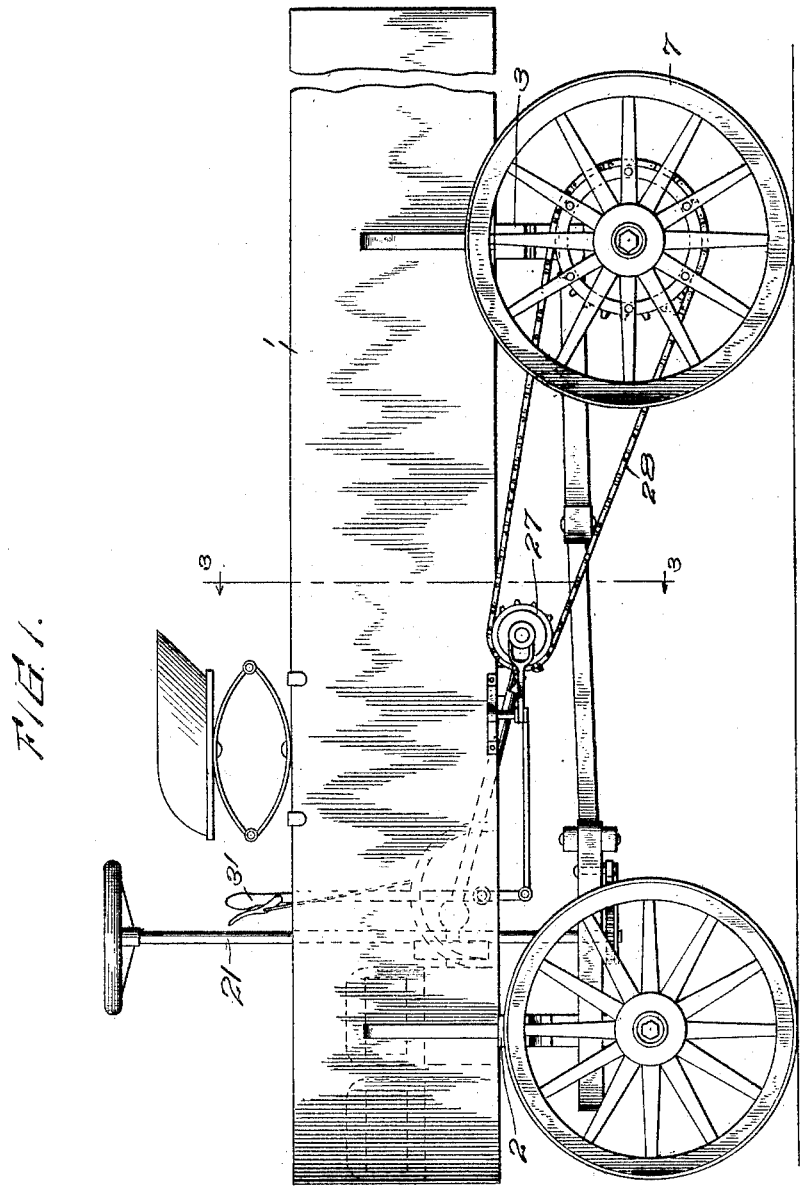

M. T. SUPAN.
STEERING AND PROPELLING MEANS FOR WAGONS.
APPLICATION FILED DEC. 16, 1913.

1,116,644.

Patented Nov. 10, 1914.
3 SHEETS—SHEET 2.

M. T. SUPAN.
STEERING AND PROPELLING MEANS FOR WAGONS.
APPLICATION FILED DEC. 16, 1913.

1,116,644.

Patented Nov. 10, 1914.
3 SHEETS—SHEET 3.

Witnesses
R. S. Trogner
L. R. Stone

Inventor
Milton T. Supan,
By John P. Duffie
Attorney

UNITED STATES PATENT OFFICE.

MILTON T. SUPAN, OF RED BLUFF, CALIFORNIA.

STEERING AND PROPELLING MEANS FOR WAGONS.

1,116,644. Specification of Letters Patent. Patented Nov. 10, 1914.

Application filed December 16, 1913. Serial No. 806,974.

*To all whom it may concern:*

Be it known that I, MILTON T. SUPAN, a citizen of the United States, residing at Red Bluff, in the State of California, have invented certain new and useful Improvements in Steering and Propelling Means for Wagons, of which the following is a specification.

This invention relates to steering devices for ordinary road wagons which have been equipped with self-propelling means and an object of the invention is to provide a steering wheel connected to the ordinary fifth-wheel of a road wagon.

Another object of the invention is to provide a steering gear of such character as will permit the rotation of the axle-tree upon which the fore-wheels are mounted, as distinguished from the ordinary construction of self-propelled vehicle where the fore axle is rigid with the chassis.

With these and other objects which will appear hereinafter, the invention resides in the combinations and arrangements of parts set forth in the description and claimed in the drawings, where similar reference characters designate corresponding parts and wherein one embodiment of my invention is shown.

Figure 2:
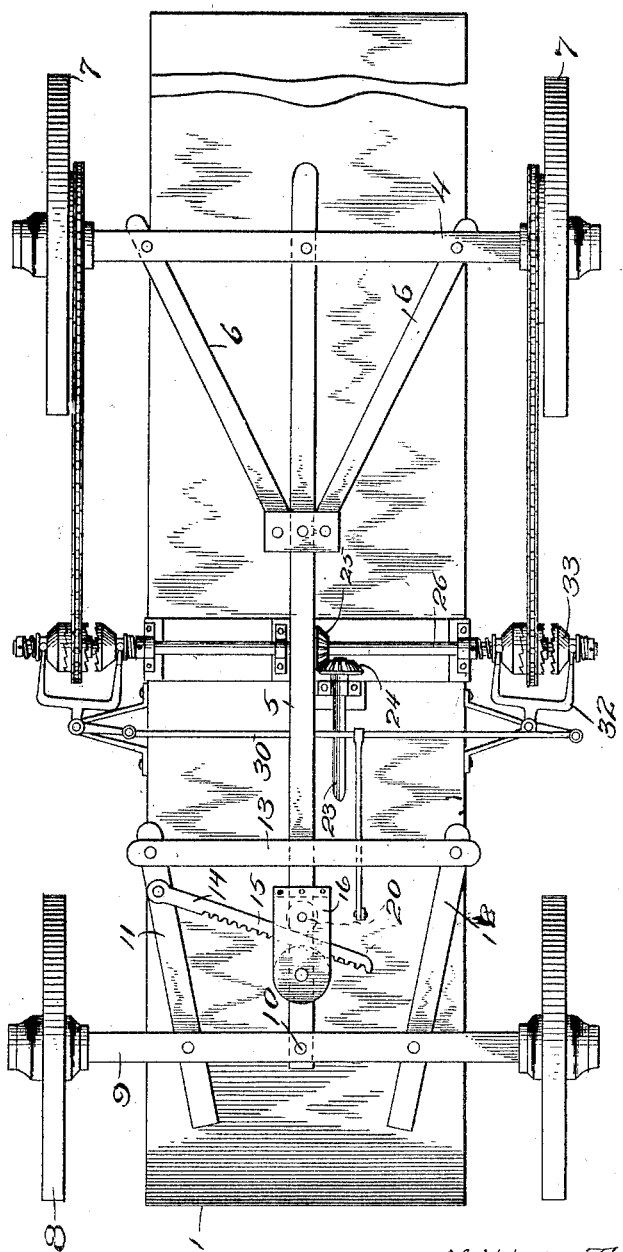
Figure 3:
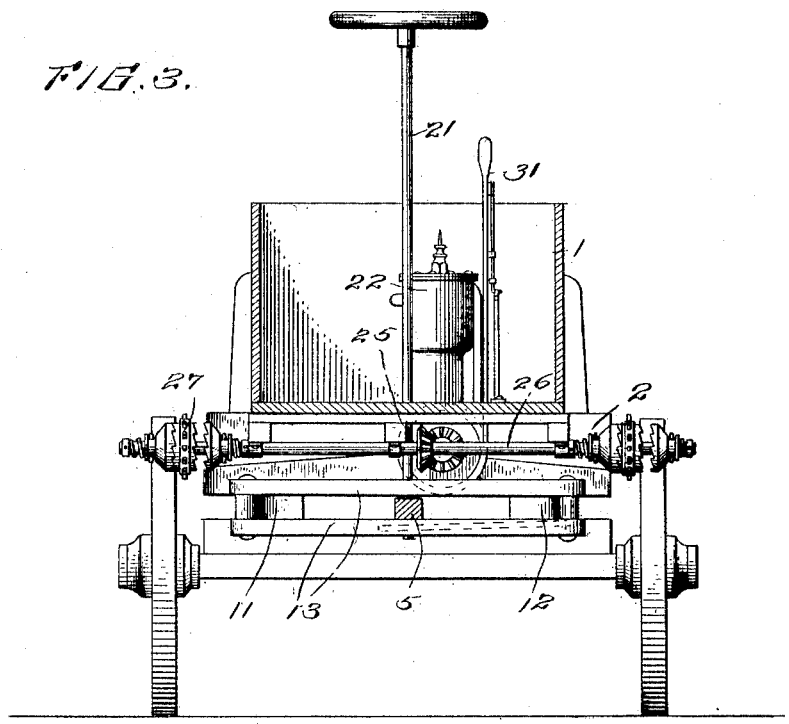
Figure 4:
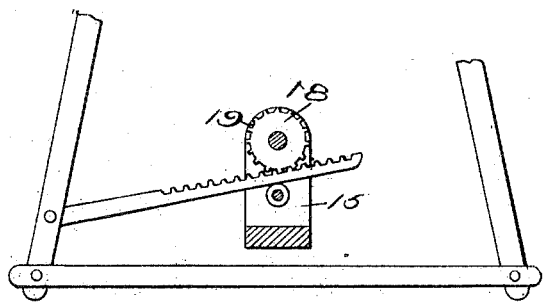
Figure 5:
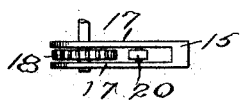

Figure 1 is a side elevation of an ordinary road wagon with my invention applied thereto; Fig. 2 is a bottom plan view of the road wagon shown in Fig. 1. Fig. 3 is a vertical transverse section through the wagon on line 3—3 of Fig. 1 looking in the direction of the arrows. Fig. 4 is an enlarged plan view of the steering gear forming the subject matter of this invention and Fig. 5 is a detail view showing the stationary parts of the steering gear.

This invention consists essentially in pivoting at a suitable point on the ordinary fifth wheel one end of a rack the teeth of which mesh with a pinion rotatably mounted upon the usual center-pole, any suitable means being provided for turning the pinion. A roller may be used to insure engagement between the rack and pinion.

In the drawings, 1 designates the body of the ordinary road wagon which may be used for hauling freight when equipped as hereinafter set forth, 2 and 3 the front and rear bolster, respectively, 4 the rear axle-tree and 5 the usual center-pole to which is secured the hounds 6. The rear wheels 7—7 are mounted on the axle-tree 4 while the fore-wheels 8—8 are mounted on the forward axle-tree 9 moving about the bolt 10. As shown in Figs. 2 and 3, the forward axle-tree has rigidly secured thereto hounds 11 and 12 lying one upon each side of the center-pole and having their rear ends, connected to guide bars 13 between which passes the center-pole 5.

Pivotally connected to one of the forward hounds as 11 adjacent the guide bars 13 and remote from the forward axle-tree is a rack 14, the free end of which is provided with teeth 15. Secured to the under side of the center-pole is a housing 16 (see Figs. 2, 4 and 5) substantially U-shaped between the parallel sides 17 of which is rotatably mounted a pinion 18 having teeth 19 which mesh with teeth 15 of the rack 14. The rack passes between the sides 17 of the housing and is guided thereby to register with the pinion. Movably mounted in the housing is a roller 20 which engages the back straight edge of the rack 4. Secured to the pinion 18 and extending through the center pole to the interior of the wagon body is a steering rod 21 which may be used to rotate the pinion when it is desired to move the rack to turn the fore axle-tree. The hounds 11 and 12 and the guide bars 13 are shown herein but obviously other forms of fifth wheels could be used with the rack and pinion without departing from the spirit of the invention.

Any form of driving mechanism may be used to propel the wagon, but I have shown an ordinary gas engine 22 having driving shaft 23, the lower end of which has a bearing and carries a bevel pinion 24 meshing with a corresponding bevel pinion 25 rigid with the counter-shaft 26 mounted rotatably upon the wagon body on the under side thereof.

Sprockets 27 are mounted one on each end of the counter shaft and drive chains 28 trained over larger sprocket wheels 29 bolted to the spokes of the rear wheels 7. Shifting rod 30 operated by hand lever 31 is connected to shifters 32 carrying clutch members 33 adapted to engage clutch members 34 rigid with the small sprockets 27. Springs 35 may be mounted upon the counter shaft to insure satisfactory operation of the driving clutches. Of course, other equipment may be associated with the driving mechanism but the mechanism shown will serve to illustrate an operative vehicle.

The operation of the steering gear is thought to be self-evident, the rotating of pinion 18 by the steering rod driving rack 14 inwardly or outwardly as the case may be, this movement of the rack causing a corresponding movement of the fore-axle-tree.

What I claim is:—

A steering gear including a central reach-pole, an axle-tree centrally pivoted to said central reach-pole at its forward end, a housing fixed to said reach-pole and having arranged therein a pinion also a rotary bearing spaced from said pinion, hounds having its lateral members fixed to said axle-tree, said lateral members having fixed to their rear ends spaced parallel bars between which is received said reach-pole, a rack pivoted at one end to one of said lateral members near its rear end, said rack extending through said housing intermediate said pinion and rotary bearing and held in engagement with said pinion by the latter, and means for actuating said pinion.

In testimony whereof I affix my signature in presence of two witnesses.

MILTON T. SUPAN.

Witnesses:
W. P. JOHNSON,
HAZEL BREARCLIFFE.

Copies of this patent may be obtained for five cents each, by addressing the "Commissioner of Patents, Washington, D. C."